Figure 1:
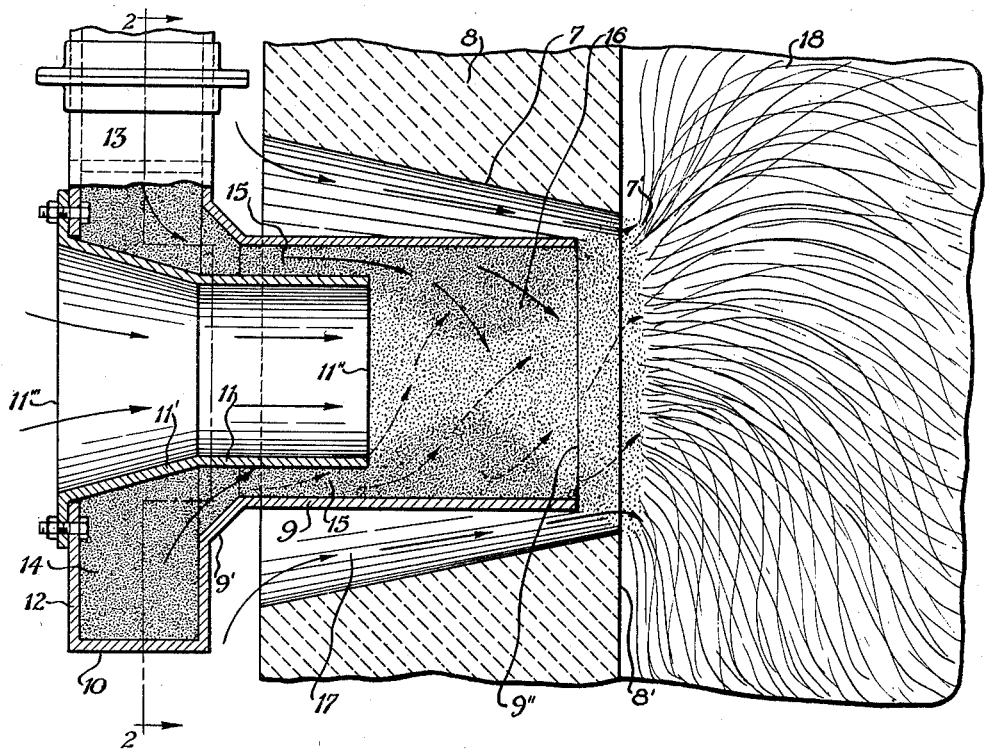

Aug. 28, 1934.  W. H. BYRNE ET AL  1,971,328
FUEL BURNER
Filed Aug. 6, 1929  3 Sheets-Sheet 1

Inventor
William H. Byrne
Charles H. Byers
By Harry Frease
Attorney

Inventor
William H. Byrne
Charles H. Byers
By Harry Frease
Attorney

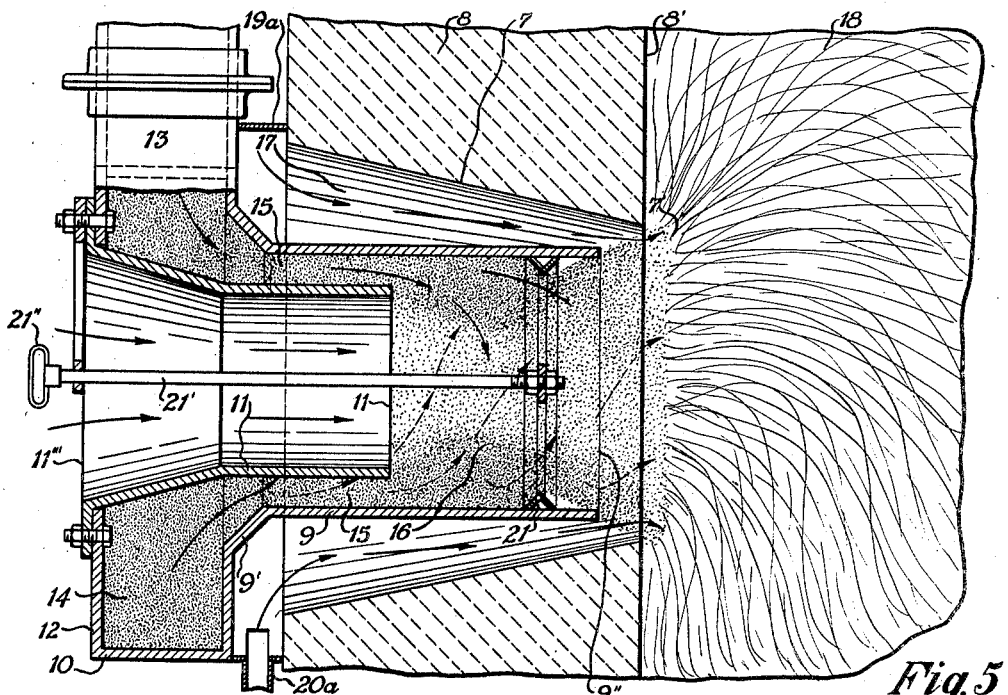
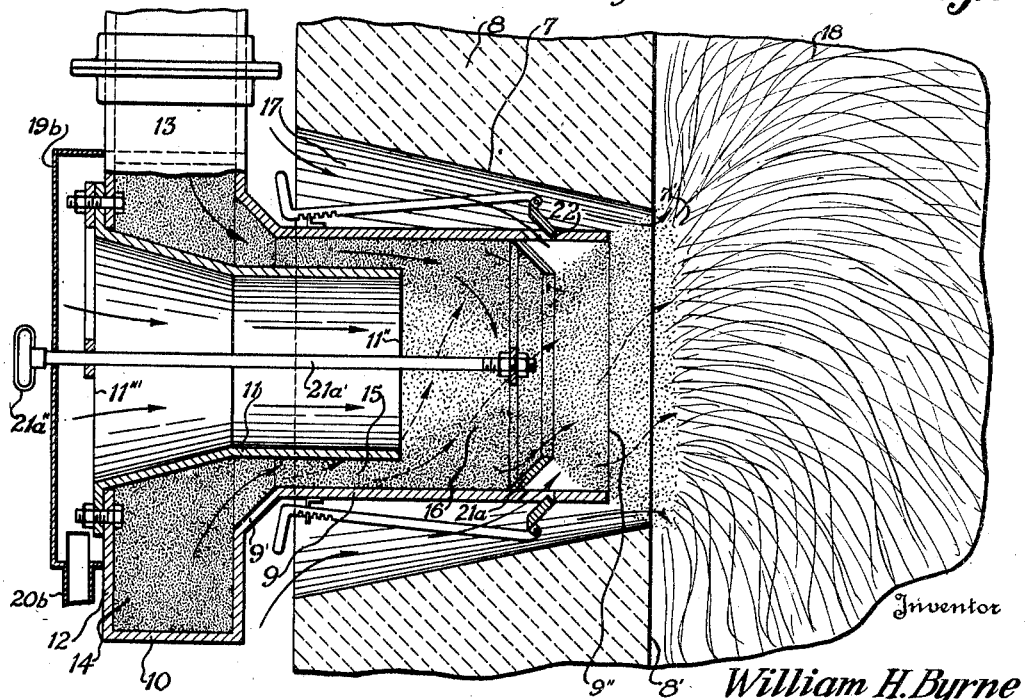

Patented Aug. 28, 1934

1,971,328

UNITED STATES PATENT OFFICE 1,971,328

FUEL BURNER

William H. Byrne, Cuyahoga Falls, and Charles H. Byers, Warren, Ohio

Application August 6, 1929, Serial No. 383,827

19 Claims. (Cl. 110—104)

This application is a continuation in part of our copending application filed February 28, 1927, Serial No. 171,549, for Fuel burners.

The invention relates to apparatus for feeding and delivering fuel of a flowing nature, especially pulverized fuel in suspension in air, for combustion within a furnace. In the illustrated embodiment, the principles of the invention are shown applied to a burner or fuel injector mounted in or on the wall of a furnace, through which burner powdered fuel carried in an air current is forced into the combustion chamber.

The general object of the present invention is to effect a more efficient mixing, injection and delivery of fluent fuel into a furnace or other place for combustion; and to inject a fuel mixture composed of fuel-laden primary air, together with supplemental secondary air, and if need be, supplemental tertiary air, for quick ignition and complete combustion, in a manner to produce a whirling flame and to control the length thereof, as for use in furnaces.

It is the purpose of the improvement to provide a fuel burner simple in construction and operation, wherein a great turbulence and swirling action is set up, without the use of spiral passageways or flanges or the like; so as to effect a more complete mixture of air with the fuel component, and thereby obtain a quicker ignition and a more complete combustion of the fuel within the furnace than would otherwise occur, together with a predetermined control of the length of the flame therein.

A particular object of the improvement is to provide a fuel burner for mixing fuel and air for burning, by rapidly moving fuel-laden primary air helically to form a vortex, then inducing a flow of secondary air axially of the vortex to mix with the fuel-laden air, and then inducing a flow of tertiary air peripherally of the vortex to mix therewith for quick ignition and substantially complete combustion.

Other and further objects and advantages of the invention will be pointed out in the descriptive part of this specification, or will be apparent to those skilled in the art; and to the attainment of such objects and advantages, the present invention consists in the novel fuel burner, feeder or injector, and the novel features of arrangement, combination, operation, design and detail hereinafter illustrated or described.

Figure 2:
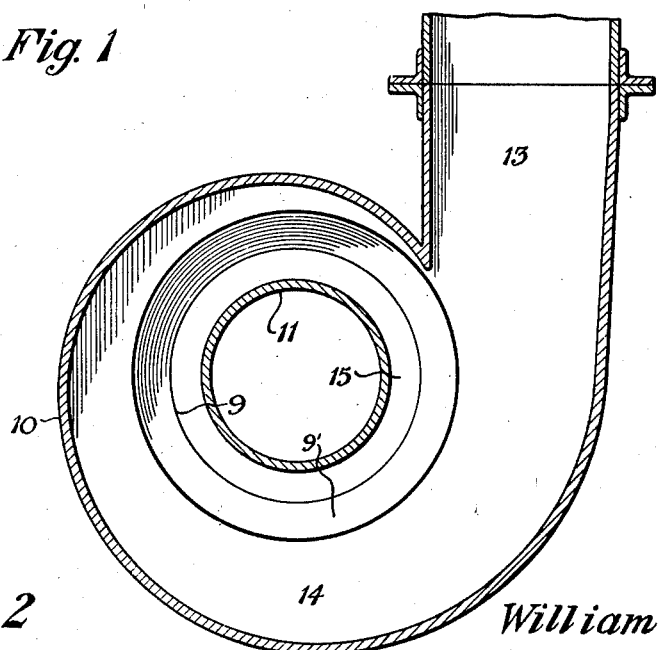
Figure 3:
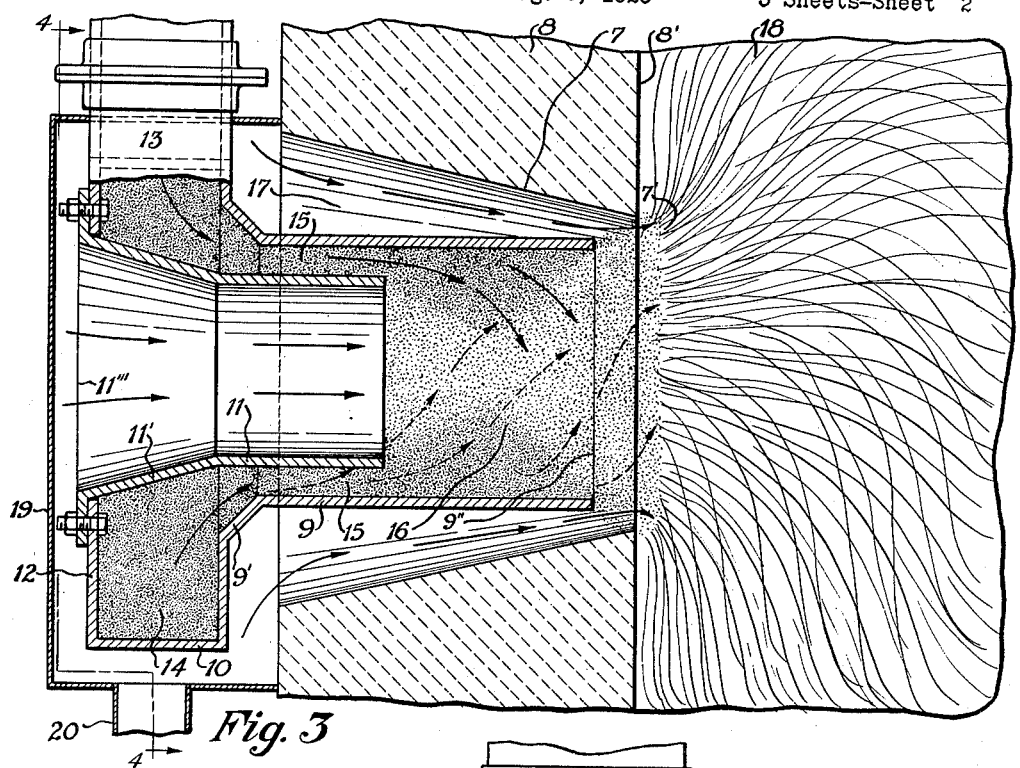
Figure 4:
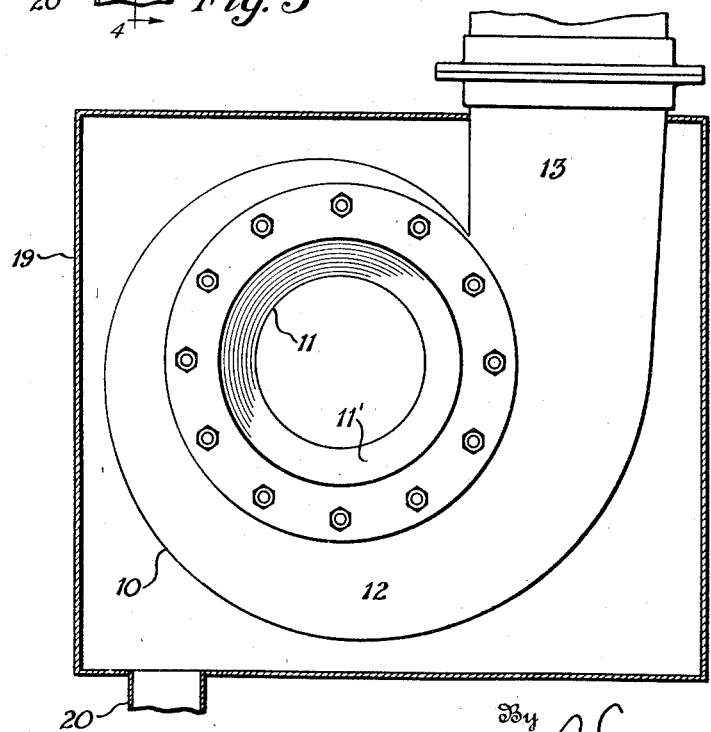

In the drawings, forming part hereof;

Figure 1 is a central longitudinal section view of a burner illustrating the principles of the invention;

Fig. 2, a cross section view of the burner on line 2—2, Fig. 1;

Fig. 3, a central longitudinal section view of a burner illustrating the principles of the invention when secondary and tertiary air is supplied under pressure;

Fig. 4, a cross section view of the air box on line 4—4, Fig. 3, showing a rear end elevation of the burner per se;

Fig. 5, a central longitudinal section view of the burner with an adjusting ring therein; and Fig. 6, a similar view showing the use of ports for receiving tertiary air forward of the adjusting ring.

Similar numerals refer to similar parts throughout the several figures of the drawings.

The burner per se may be and preferably is located in a conical opening 7 in the ordinary refractory wall 8 of a furnace; and when so located, the burner is composed of an outer tube 9, having a spiral enlargement 10 on its rear end and an inner tube 11 extending from the rear end into the forward straight portion of the outer tube.

For the purpose of the present invention, the spiral enlargement of the outer tube is provided with a rear end wall 12, forming a closure around the rear end portion of the inner tube, and also with a tangential inlet pipe 13 on one side, so as to form an enlarged spiral entry chamber 14 around the rear end of the inner tube; and the rear end portion 11' of the inner tube is preferably flared rearward in the entry chamber, so as to deflect the flow of fuel-laden air forward.

The inner tube extends forward through the entry chamber and a substantial distance into the rear central portion of the forward straight portion of the outer tube, so as to form an annular fuel passageway 15 permitting free and unconstricted passage of the fluent fuel between the two tubes, and extending from the entry chamber forward; and the rear end 9' of the outer tube is preferably flared rearward at the junction with its spiral enlargement, to facilitate the entrance of fluent fuel into the annular passageway.

The forward end 11'' of the inner tube is located within the forward straight portion of the outer tube and a substantial distance in rear of the forward end 9'' of the outer tube, or substantially midway between the ends of the straight forward portion of the outer tube, so as to form a mixing chamber 16 of considerable size within the forward portion of the outer tube; which mixing chamber may have a length of some thirteen inches in an outer tube having an inside diameter of some sixteen inches.

The wall of the furnace around the conical opening 7, forms a forwardly tapered annular passageway 17 outside the outer tube, and the forward end 9'' of the outer tube is preferably located a substantial distance in rear of the inner face 8' of the furnace wall, so that the tapered wall of the opening 7 will somewhat overlap the forward end of the outer tube; and it has been found that the operation of the burner is greatly facilitated by highly polishing the inner side of the outer tube, so as to remove all roughness therein which would impede the free flow of fluent fuel.

The tangential inlet pipe communicates with a source of supply (not shown) of fuel-laden primary air, under pressure, of say six inches of water, and the fluent fuel is given a high-speed rotary motion in the spiral entry chamber 14, whence it is forced forward with a whirling helical movement through the annular passageway 15, and after it passes the forward end 11'' of the inner tube, the whirling annular column of dust-laden air is free to expand inward in the mixing chamber 16, wherein it forms a vortex and axially aspirates or siphons a column of secondary air through the inner tube 11 from the open rear end 11''' thereof, which secondary air is thoroughly mixed with the fuel carried by the primary air within the vortex in the chamber 16 before being discharged from the forward end 9'' of the outer tube.

When the rapidly whirling fuel-laden air is discharged forward from the vortex, it is again free to expand outward, within the limits of the tapered opening 7, so that it will induce an annular column of tertiary air through the annular passageway 17, which will thoroughly mix with the primary and secondary air by the whirling action of the column thereof as it emerges into the combustion chamber 18 of the furnace, wherein the fuel is quickly ignited at 7' closely adjacent to the forward end of the tapered opening 7 which comprises the forward and discharge end or mouth of the burner.

The expansion of the column of fuel-laden air to form the vortex in the mixing chamber 16, and the further expansion thereof as it emerges from the burner into the furnace, slackens the forward speed of the rapidly whirling fuel-laden air so that the length of the flame in the furnace is reduced and may be limited to a predetermined extent by varying the differences in the location of the forward ends of the respective tubes and of the opening in the surrounding wall.

It has been found in actual practice that with a pressure of some six inches of water in the entry chamber, the length of the flame may be so controlled and limited that it will reach to, but will not impinge a bridge wall located some thirteen feet in front of the mouth of the burner. This control is obtained by changing the pitch or whirl or helix of the mass of air and fuel, without any reduction of the burner opening or of the initial pressure, or of the velocity of the mixture leaving the burner; and the same control permits the use of preheated air without any change in the burner design.

Moreover, the whirling action of fuel-laden primary air in the entry chamber prevents a stratification of the fuel particles therein, so that there is a thorough mixture of the fuel particles and primary air as the same is driven helically forward in an annular column through the passageway 15, to form a vortex in the mixing chamber 16; wherein there is a complete mixture of the axially induced secondary air, with the fuel particles and the primary air, by the whirling action of the vortex; after which there is a complete mixture of the peripherally induced tertiary air, with the fuel particles and primary and secondary airs, by the whirling action of the vortex, before the combined mixture reaches the point of ignition adjacent the mouth of the burner.

The uniformity with which the primary, secondary and tertiary airs are mixed with the fuel particles, results in a quicker ignition at the mouth of the burner and a more complete combustion of the fuel within the furnace than would otherwise occur; and it is obvious that because of the simplicity and shortness of the burner, the fluent fuel can be initially ignited very readily by merely inserting a torch through the inner tube 11 and the mixing chamber 16, so as to readily ignite the fuel at the densest point of the mass.

In Figs. 3 and 4, an air box 19 is shown, which encloses the rear end of the burner, and permits secondary and tertiary airs to be supplied under pressure, from a suitable source of supply, not shown, through an intake pipe 20; it being understood, however, that such pressure must be so limited that it will not overcome the inducing or aspirating action of the fuel-laden primary air.

In Fig. 5 is shown an adjustable deflecting ring 21 which may be in the form of a V-section mounted for sliding forward or rearward in the forward portion of the outer tube 9, as by means of an axial bar 21' extending inward to a handle 21'' at the rear end of the burner; by means of which the periphery of the vortex may be deflected inwardly, to more intensely concentrate the mass of fuel and air, and to further effect a control of the length of the flame by retarding the forward movement of the fluent fuel.

Fig. 5 also shows an air box 19a with an intake pipe 20a, by which tertiary air under pressure may be supplied through the annular passageway 17.

In Fig. 6 a similar deflecting ring 21a is shown, formed of a single inclined flange, which may be combined with a number of damper controlled air ports 22 opening in front of the ring, so as to admit tertiary air into the vortex before it emerges from the mixing chamber; so as to intersect the mass of air and fuel therein, and increase the turbulence thereof, which results in a more intimate mixture of the tertiary air as it is absorbed into the whirl of the mass of the vortex.

Fig. 6 also shows an air box 19b with an intake pipe 20b, by which secondary air under pressure may be supplied through the inner tube 11.

And in all forms of the burner, the admission of secondary air into the center of the vortex and of tertiary air around the periphery thereof, completely air cools the forward end or tip 9'' of the outer tube, and by keeping the metal of the burner below burning temperature, prevents a coking of fuel thereon, from the heat of combustion and the radiant heat of the furnace.

We claim:—

1. A burner for fluent fuel and the like under pressure, including an outer tube having an enlarged spiral entry chamber with a tangential inlet at its rear end, the outer tube including a substantially straight forward portion permitting free passage of fluent fuel and a rearwardly flared portion connecting the forward portion and the rear entry chamber, an inner tube extending through the entry chamber into the outer tube and forming an annular fuel passageway from the entry chamber into the outer tube, the forward end of the inner tube terminating substantially midway between the ends of the straight forward portion of the outer tube, and a forwardly tapered wall surrounding the outer tube and forming an annular passageway outside the same, said wall extending forward beyond the forward end of the outer tube.

2. A burner for fluent fuel and the like under pressure, including an outer tube having an enlarged entry chamber with a tangential inlet at its rear end, the outer tube including a substantially straight forward portion permitting free passage of fluent fuel and a rearwardly flared portion connecting the forward portion and the rear entry chamber, an inner tube extending through the entry chamber into the outer tube and forming an annular fuel passageway from the entry chamber into the outer tube, the forward end of the inner tube terminating substantially midway between the ends of the straight forward portion of the outer tube, and a forwardly tapered wall surrounding the outer tube and forming an annular passageway outside the same, said wall extending forward beyond the forward end of the outer tube.

3. A burner for fluent fuel and the like under pressure, including an outer tube having an enlarged spiral entry chamber with a tangential inlet at its rear end, the outer tube including a substantially straight forward portion permitting free passage of fluent fuel and a rearwardly flared portion connecting the forward portion and the rear entry chamber, an inner tube extending through the entry chamber into the outer tube and forming an annular fuel passageway extending from the entry chamber into the outer tube, the forward end of the inner tube terminating substantially midway between the ends of the straight forward portion of the outer tube, and a wall surrounding the outer tube and forming an annular passageway outside the same, said wall extending forward beyond the forward end of the outer tube.

4. A burner for fluent fuel and the like under pressure, including an outer tube having an enlarged entry chamber with a tangential inlet at its rear end, the outer tube including a substantially straight forward portion permitting free passage of fluent fuel and a rearwardly flared portion connecting the forward portion and the rear entry chamber, an inner tube extending through the entry chamber into the outer tube and forming an annular fuel passageway from the entry chamber into the outer tube, the forward end of the inner tube terminating substantially midway between the ends of the straight forward portion of the outer tube, and a wall surrounding the outer tube and forming an annular passageway outside the same, said wall extending forward beyond the forward end of the outer tube.

5. A burner for fluent fuel and the like under pressure, including an outer tube having an enlarged entry chamber with a tangential inlet at its rear end, an inner tube extending through the entry chamber into the outer tube and forming an annular fuel passageway extending from the entry chamber a substantial distance into the outer tube, the forward end of the inner tube terminating a substantial distance in rear of the forward end of the outer tube, a deflecting ring in the forward portion of the outer tube, and air ports in the outer tube forward of the deflecting ring.

6. A burner for fluent fuel and the like under pressure, including an outer tube having an enlarged entry chamber with a tangential inlet at its rear end, an inner tube extending through the entry chamber a substantial distance into the outer tube and forming an annular fuel passageway extending from the entry chamber into the outer tube, the forward end of the inner tube terminating a substantial distance in rear of the forward end of the outer tube, and a deflecting ring in the forward portion of the outer tube.

7. A burner for fluent fuel and the like under pressure, including an outer tube having an enlarged entry chamber with a tangential inlet at its rear end, an inner tube extending through the entry chamber a substantial distance into the outer tube and forming an annular fuel passageway extending from the entry chamber into the outer tube, the forward end of the inner tube terminating a substantial distance in rear of the forward end of the outer tube, and air ports in the outer tube forward of the inner tube.

8. A burner for fluent fuel and the like under pressure, including an outer tube having an enlarged spiral entry chamber with a tangential inlet at its rear end, the outer tube including a substantially straight forward portion permitting free passage of fluent fuel and a rearwardly flared portion connecting the forward portion and the rear entry chamber, an inner tube extending through the entry chamber into the outer tube and forming an annular fuel passageway from the entry chamber into the outer tube, the forward end of the inner tube terminating substantially midway between the ends of the straight forward portion of the outer tube, and a wall surrounding the outer tube and forming an annular passageway outside the same.

9. A burner for fluent fuel and the like under pressure, including an outer tube having an enlarged entry chamber with a tangential inlet at its rear end, the outer tube including a substantially straight forward portion permitting free passage of fluent fuel and a rearwardly flared portion connecting the forward portion and the rear entry chamber, an inner tube extending through the entry chamber into the outer tube and forming an annular fuel passageway from the entry chamber into the outer tube, the forward end of the inner tube terminating substantially midway between the ends of the straight forward portion of the outer tube, and a wall surrounding the outer tube and forming an annular passageway outside the same.

10. A burner for fluent fuel and the like under pressure, including an outer tube having an enlarged spiral entry chamber with a tangential inlet at its rear end, the outer tube including a substantially straight forward portion permitting free passage of fluent fuel and a rearwardly flared portion connecting the forward portion and the rear entry chamber, an inner tube extending through the entry chamber into the outer tube and forming an annular fuel passageway extending from the entry chamber into the outer tube, the forward end of the inner tube terminating substantially midway between the ends of the straight forward portion of the outer tube.

11. A burner for fluent fuel and the like under pressure, including an outer tube having an enlarged entry chamber with a tangential inlet at its rear end, the outer tube including a substantially straight forward portion permitting free passage of fluent fuel and a rearwardly flared portion connecting the forward portion and the rear entry chamber, an inner tube extending through the entry chamber into the outer tube and forming an annular fuel passageway extending from the entry chamber into the outer tube, the forward end of the inner tube terminating substantially midway between the ends of the straight forward portion of the outer tube.

12. A burner for fluent fuel and the like under pressure, including an outer tube having an enlarged spiral entry chamber with a tangential inlet at its rear end and a substantially straight portion at its forward end, an inner tube extending through the entry chamber a substantial distance into the substantially straight portion of the outer tube and forming an annular fuel passageway from the entry chamber forward between the outer and inner tubes, and a wall surrounding the outer tube and forming an annular passageway outside the same.

13. A burner for fluent fuel and the like under pressure, including an outer tube having an enlarged entry chamber with a tangential inlet at its rear end and a substantially straight portion at its forward end, an inner tube extending through the entry chamber a substantial distance into the substantially straight portion of the outer tube and forming an annular fuel passageway from the entry chamber forward between the outer and inner tubes, and a wall surrounding the outer tube and forming an annular passageway outside the same.

14. A burner for fluent fuel and the like under pressure, including an outer tube having an enlarged spiral entry chamber with a tangential inlet at its rear end and a substantially straight portion at its forward end, an inner tube extending through the entry chamber a substantial distance into the substantially straight portion of the outer tube and forming an annular fuel passageway from the entry chamber forward between the outer and inner tubes.

15. A burner for fluent fuel and the like under pressure, including an outer tube having an enlarged entry chamber with a tangential inlet at its rear end and a substantially straight portion at its forward end, an inner tube extending through the entry chamber a substantial distance into the substantially straight portion of the outer tube and forming an annular fuel passageway from the entry chamber forward between the outer and inner tubes.

16. The method of mixing fuel-laden air for burning, which consists in rapidly whirling fuel-laden primary air helically to form a vortex, then providing communication axially of the vortex with the atmosphere to induce a flow of secondary air axially of the vortex to mix with the fuel-laden air, and then inducing a flow of tertiary air peripherally of the vortex to mix therewith.

17. The method of mixing fuel-laden air for burning, which consists in rapidly whirling fuel-laden primary air helically to form a vortex, and then causing the helically whirling fuel-laden primary air to induce a flow of secondary air axially of the vortex to mix with the fuel laden air.

18. The method of mixing fuel-laden air for burning, which includes rapidly whirling fuel-laden primary air to form a helix, then inducing a flow of secondary air axially of the helix and introducing the flow of secondary air intermediate the ends of the helix into intimate mixture with the fuel-laden primary air.

19. The method of mixing fuel-laden air for burning, which includes rapidly whirling fuel-laden primary air to form a helix and its resultant vortex, then inducing a flow of secondary air axially of the helix and introducing the flow of secondary air intermediate the ends of the helix into intimate mixture with the fuel-laden primary air, and then inducing a flow of tertiary air peripherally of the vortex to mix therewith.

WILLIAM H. BYRNE.
CHARLES H. BYERS.